United States Patent
Higa et al.

(10) Patent No.: US 6,295,102 B1
(45) Date of Patent: Sep. 25, 2001

(54) LIQUID-CRYSTAL SHUTTER

(75) Inventors: Masakatsu Higa; Hisao Takahashi; Hiroyuki Sakayori, all of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/572,654

(22) Filed: May 16, 2000

(30) Foreign Application Priority Data

May 19, 1999 (JP) .................................................. 11-138166

(51) Int. Cl.[7] ........................ G02F 1/1337; G02F 1/1333
(52) U.S. Cl. .......................... 349/13; 349/15; 349/123; 349/158
(58) Field of Search .................. 349/13, 15, 123, 349/124, 158; 359/376, 462; 348/51

(56) References Cited

U.S. PATENT DOCUMENTS

| | | | |
|---|---|---|---|
| 4,544,583 | * 10/1985 | Claussen et al. | 428/1 |
| 4,561,724 | * 12/1985 | Otaki et al. | 350/334 |
| 4,620,772 | * 11/1986 | Sugimoto et al. | 350/337 |
| 5,844,648 | 12/1998 | Higa | 349/117 |
| 6,151,088 | * 11/2000 | Higa | 349/99 |

FOREIGN PATENT DOCUMENTS

| | | |
|---|---|---|
| 60-078420 | 5/1985 | (JP) . |
| 61-100726 | 5/1986 | (JP) . |
| 8-106070 | 4/1996 | (JP) . |
| 9-304731 | 11/1997 | (JP) . |

* cited by examiner

*Primary Examiner*—William L. Sikes
*Assistant Examiner*—Tarifur R. Chowdhury
(74) *Attorney, Agent, or Firm*—Oblon, Spivak, McClelland, Maier & Neustadt, P.C.

(57) ABSTRACT

A pair of transparent film substrates are provided. A transparent electrode and an orientation film are formed on each of the pair of transparent film substrates in sequence. A liquid crystal is inserted between the pair of film substrates. An orientation process is performed on each of the orientation films such that a visual-angle direction in which a maximum contrast is obtained is a six-o'clock direction or a twelve-o'clock direction based on a direction of the short hand of a clock. Each of the pair of film substrates is an optically anisotropic body, having a retardation value in the range of 5 to 30 nm in the plane of the film substrates. Assuming that long-axis directions denote directions parallel to the longest side of the periphery of the liquid-crystal shutter, the lagging-axis directions in the plane of the film substrates are approximately parallel to the long-axis directions.

4 Claims, 8 Drawing Sheets

FIG.9

| ITEM | LAGGING AXIS OF UPPER SUBSTRATE | LAGGING AXIS OF LOWER SUBSTRATE | STICKING OF POLARIZING PLATE | TRANSMITTANCE(%) IN INITIAL STAGE | TRANSMITTANCE(%) AFTER 240 HRS IN 70°C |
|---|---|---|---|---|---|
| ARRANGEMENT 1 | 0° | 0° | STICKING | 5.5 | 13.8 |
| ARRANGEMENT 2 | 45° | -45° | STICKING | 1.7 | 11.2 |
| ARRANGEMENT 3 | 0° | 90° | STICKING | 1.1 | 6.2 |
| ARRANGEMENT 4 | 0° | 90° | NOT STICKING | 0.6 | 0.6 |
| ARRANGEMENT 5 | 90° | 90° | STICKING | 0.5 | 3.1 |

LIQUID-CRYSTAL SHUTTER

BACKGROUND OF THE INVENTION

1. Field of the Invention

The present invention relates to a liquid-crystal shutter.

2. Description of the Related Art

A liquid-crystal device using plastic films or plastic plates as the substrates thereof is thin and lightweight in comparison to a liquid-crystal device using glass substrates. Also, it is possible for such a liquid-crystal device to have a curved outline and a curved surface. Therefore, such a type of liquid-crystal device has drawn attention because this type of liquid-crystal device is suitable as a liquid-crystal shutter, such as sunglasses or goggles, the transmittance of which is electrically adjustable, used in front of a human face, for example.

Because such a liquid-crystal shutter is not required to be driven in a high-rate time-sharing manner, a TN-type liquid crystal (90°-twisted twisted-nematic type liquid crystal) is used as the liquid-crystal shutter. It is easy to obtain a high contrast from the TN-type liquid crystal.

Although it is preferable that plastic-film substrates of such a type of liquid-crystal device be optically isotropic, a completely optically isotropic plastic-film substrate has not been put to a practical use. Further, although it is possible to obtain a plastic-film substrate which is initially approximately isotropic, it is easy for the plastic-film substrate to have anisotropy developing therein due to deformation thereof caused by a stress being applied thereto or deformation thereof caused by temperature or humidity. Accordingly, it can be said that any plastic-film substrate is somewhat anisotropic in general.

When such a film substrate having optical anisotropy is used as the substrates of a liquid-crystal device, a bad influence of the anisotropy thereof can be reduced as a result of the retardation values of the plastic substrates being caused to be not more than 15 nm as disclosed in Japanese Laid-Open Patent Application No. 60-78420, or as a result of the directions of optical axis of the film substrates being caused to be coincident to or perpendicular to the directions of absorption axis of polarizing plates as disclosed in Japanese Laid-Open Patent Application No. 61-100726. The retardation value is a value of $d\Delta n$ where $\Delta n$ denotes the difference in refractive index between a direction perpendicular to and a direction parallel to the optical-anisotropy axis of the substrate, and 'd' denotes the thickness of the substrate.

However, the retardation of a uniaxially-stretched film substrate is on the order of 1 $\mu$m, and, is approximately the same as or larger than the retardation of a liquid-crystal layer. Therefore, it is necessary to cause the polarization axis of the polarizing plate and the lagging axis of the substrate to strictly coincide with one another. When the directions of the axes differ from one another even slightly, deterioration in contrast and/or brightness of the liquid-crystal device develops.

Further, in general, a plastic film is a so-called double-axis optically anisotropic body in which not only the refractive indexes in directions in the plane thereof differ from one another but also the refractive index in the thickness directions differs from the refractive index of a direction in the plane thereof. Therefore, the retardation value obtained when the film substrate is viewed from an oblique direction is different from that obtained when it is viewed from the front direction due to an influence of the refractive index nz in the thickness directions. Such a change in retardation of the film substrate due to a change in visual-angle direction causes a change in brightness due to a change in visual-angle direction and deterioration in contrast.

Due to recent improvement in manufacturing technology of plastic-film substrates, optical anisotropy in directions parallel to the plane of a substrate is reduced, and, it has been possible to manufacture a plastic-film substrate in which the optical-axis directions are within ±10°, and, also, the magnitude of retardation is not more than 30 nm, and, in some case, not more than 10 nm.

However, it is very difficult to control the refractive index in the thickness directions to a predetermined value, and, a substrate in which the refractive index in the thickness directions is maintained at a predetermined value has not been put into practical use.

Substrates for liquid-crystal devices are desired to have a durability against chemicals and solvents which are used in manufacturing processes thereof, a sufficient gas-barrier property and a sufficient surface-smoothness property, and so forth.

Accordingly, an arrangement of a plastic-film substrate is required such that, even when the refractive index nz in the thickness directions is smaller than the refractive indexes nx and ny in the directions in the plane thereof, and, thereby, the retardation value of the substrate itself changes due to a change in visual-angle direction, a liquid-crystal device made using such substrates has good visual-angle characteristics.

FIG. 1 shows a plan view of a state in which a human being 1 views objects 3 through a liquid-crystal shutter 2. A liquid-crystal shutter used in a condition of being arranged in front of the face of a human being is required to have the same brightness and contrast characteristics for both the eyes thereof. However, in general, a liquid-crystal shutter has a so-called visual-angle property such that brightness and contrast differ depending on direction in which light is transmitted thereby. Further, when a liquid-crystal shutter is used in a condition of being arranged in front of the face of a human being, the distance between the eyes and the liquid-crystal shutter is small. Thereby, the influence of the visual-angle property is large. Accordingly, the brightness sensed by one eye may be different from the brightness sensed by the other eye through the liquid-crystal shutter depending on the angle at which the human being 1 views the objects 3. When the brightness sensed by one eye is different from the brightness sensed by the other eye, this matter causes fatigue of the eyes.

Accordingly, it is important to cause the contrast characteristics of a liquid-crystal shutter used in front of the face of a human being for one eye of the human being to be the same as those thereof for the other eye of the human being. When a liquid-crystal shutter is used in front of the face of a human being, a portion thereof corresponding to the nose of the human being is constricted so that the liquid-crystal shutter has a shape of glasses, as shown in FIG. 2 which shows a front elevational view of the liquid-crystal shutter. As shown in FIG. 2, the liquid-crystal shutter includes right and left display portions (transparent-electrode opposing portions) 13a and 13b, an extended electrode portion 14, and a constricted portion 15. FIG. 2 also shows lagging-axis directions 106 of upper and lower substrates, lagging-axis directions 107 of retardation developing due to a stress as described later, and long-axis directions 108 of the liquid-crystal shutter (which directions are directions parallel to the longest side of the periphery of the liquid-crystal shutter)

and short-axis directions 109 thereof (which directions are directions perpendicular to the long-axis directions).

When a liquid-crystal shutter has the above-described arrangement, the stress due to shrinkage of polarizing plates thereof and so forth concentrates at the constricted portion 15, and, thereby, retardation develops in substrates thereof (the retardation develops in the directions 107 in FIG. 2).

Shrinkage of polarizing plates is larger in the long-axis directions than that in the short-axis directions. Therefore, retardation developing in substrates in the middle of a liquid-crystal shutter develops in the directions 107 and causes a decline in contrast. By this reason, it is not possible to easily achieve a liquid-crystal shutter having a constricted shape as shown in FIG. 2. Similarly, achievement of a liquid-crystal shutter having a curved-surface shape has a problem in that development of retardation in substrates thereof due to stress results in decline in contrast.

SUMMARY OF THE INVENTION

An object of the present invention is to provide a liquid-crystal shutter using film substrates, which provides a high contrast, and can provide brightness and contrast characteristics such that the brightness and contrast characteristics for one eye of a human being is the same as those for the other eye of the human being.

Another object of the present invention is to provide a liquid-crystal shutter by which brightness obtained by one eye of a human being is equivalent to brightness obtained by the other eye of the human being, and, in particular, contrasts are good for right and left visual-angle directions.

A liquid-crystal shutter according to the present invention comprises:
   a pair of transparent film substrates, a transparent electrode and an orientation film being formed in sequence on each of the pair of transparent film substrates; and
   a liquid crystal inserted between the pair of film substrates,
   wherein:
      an orientation process is performed on each of the orientation films such that a visual-angle direction in which a maximum contrast is obtained is a six-o'clock direction or a twelve-o'clock direction based on a direction of the short hand of a clock;
      each of the pair of film substrates is an optically anisotropic body such that refractive indexes thereof in thickness directions and plane directions differ, and has a retardation value or retardation values in the range of 5 to 30 nm in the plane of the film substrate, wherein, assuming that long-axis directions denote directions parallel to the longest side of the periphery of the liquid-crystal shutter, the lagging-axis directions in the plane of the film substrates are approximately parallel to the long-axis directions of the liquid-crystal shutter.

Thereby, brightness sensed by both the eyes of a human being through the liquid-crystal shutter is approximately uniform when the eyes view objects in all the directions, and, also, the liquid-crystal shutter provides good right and left contrasts.

An approximately-90°-twisted twisted-nematic crystal may be used as the liquid crystal.

Further, the liquid-crystal shutter may have a curved-line shape such that a portion of the periphery of the liquid-crystal shutter is constricted in the middle.

Thereby, it is possible to achieve a liquid-crystal shutter which can be easily loaded on the face of a human being.

Further, as mentioned above, the long-axis directions of the liquid-crystal shutter are approximately parallel to the lagging-axis directions (maximum-refractive-index directions) of the film substrates. Thereby, when stress caused by shrinkage of polarizing plates concentrates on the constricted portion, the liquid-crystal shutter provides good contrast, because the directions of retardation developing in the film substrates due to that stress are perpendicular to the directions of retardation in a case where no stress is applied to the film substrates, it is possible to obtain a liquid-crystal shutter providing good contrasts.

The liquid-crystal shutter may be bent in the long-axis directions thereof so as to have a curved-surface shape.

Thereby, it is possible to improve contrasts for right and left directions. Further, as mentioned above, the long-axis directions of the liquid-crystal shutter are approximately parallel to the lagging-axis directions (maximum-refractive-index directions) of the film substrates. Thereby, development of substrate retardation due to the liquid-crystal shutter being bent in the long-axis directions can be cancelled, and, thereby, the contrasts can be improved.

Other objects and further features of the present invention will become more apparent from the following detailed description when read in conjunction with the accompanying drawings.

BRIEF DESCRIPTION OF THE DRAWINGS

FIG. 9 shows results of evaluations performed on liquid-crystal shutters having arrangements shown in FIG. 8.

DETAILED DESCRIPTION OF THE PREFERRED EMBODIMENT

Figure 3:
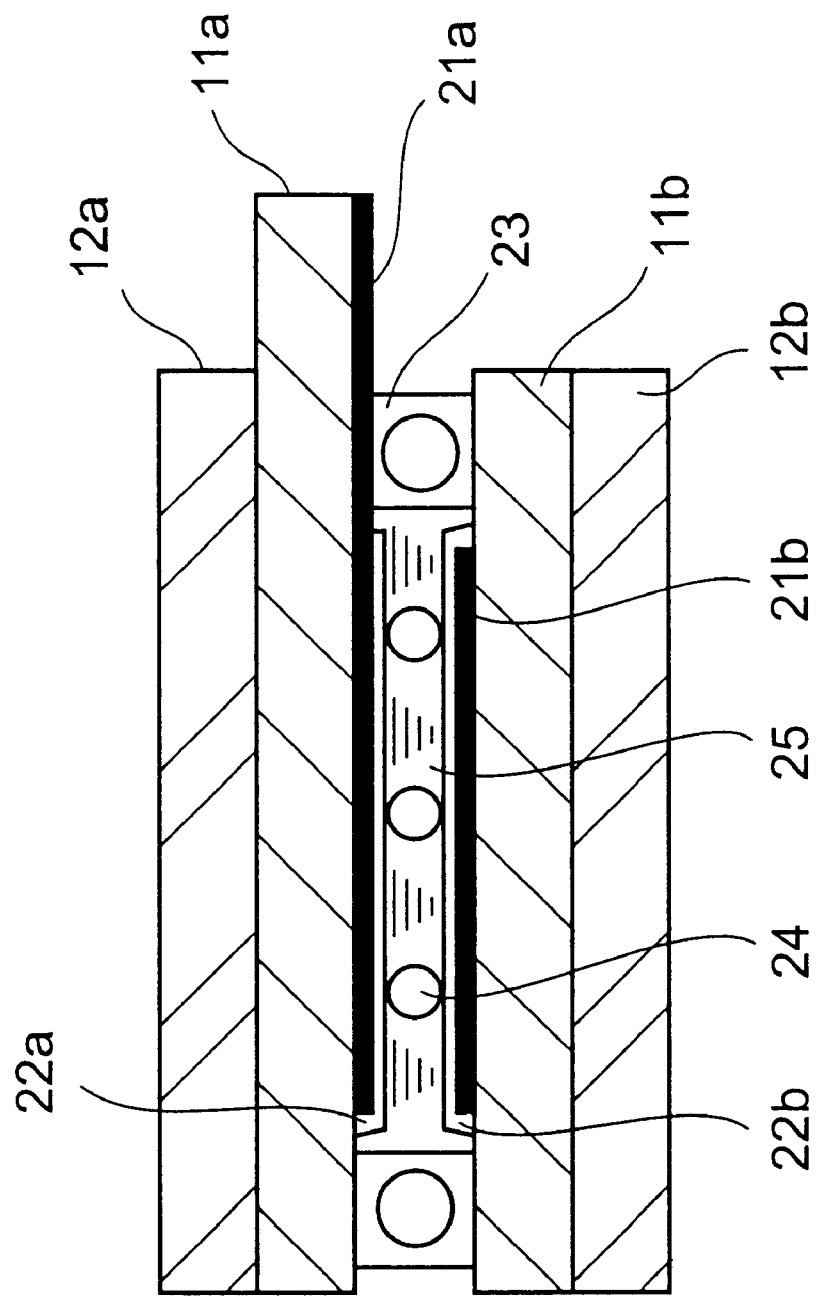
FIG. 3 shows a sectional view of a liquid-crystal shutter in each of first and second embodiments according to the present invention.

Embodiments of the present invention will now be described based on figures. FIG. 3 shows a sectional view of an arrangement of a liquid-crystal shutter in each of first and second embodiments of the present invention. As shown in FIG. 3, this liquid-crystal shutter (plastic-film liquid-crystal shutter) includes an upper substrate (for example, a transparent plastic-film substrate) 11a, and a transparent electrode 21a and an orientation film 22a which are formed in sequence on the upper substrate 11a. The liquid-crystal shutter further includes a lower substrate (for example, a transparent plastic-film substrate) 11b, and a transparent electrode 21b and an orientation film 22b which are formed in sequence on the lower substrate 11b. A seal 23 and spacers 24 are arranged between the upper and lower substrates 11a and 11b. Further, a liquid crystal 25 is inserted (sealed) between the upper and lower substrates 11a and 11b. Further, the liquid-crystal shutter includes an upper polarizing plate 12a and a lower polarizing plate 12b.

An approximately-90°-twisted twisted-nematic crystal, for example, a chiral nematic crystal such that left twisting is obtained therein is used as the liquid crystal 25. Further, it is possible to form each of the orientation films 22a and 22b by printing a soluble polyimide orientation agent AL-3046 made by JSR Corporation by a flexographic printing method, and, after burning it, performing an orientation process by a rubbing process thereon, for example.

Further, it possible to form each of the substrates 11a and 11b by, for example, forming gas-barrier layers and anti-solvent hard-coat layers on both the sides of a polycarbonate film made by a solvent casting method having a thickness of 100 µm, a respective one of the transparent electrodes 21a and 21b having a thickness of 30 nm made of ITO being then formed on one side thereof.

In a liquid-crystal shutter (for example, a plastic-film liquid-crystal shutter), such as that shown in FIG. 3, using film substrates (for example, plastic-film substrates), each of the orientation films 22a and 22b has an orientation process performed thereon such that a visual-angle direction (good visual-angle direction) in which the maximum contrast is obtained therefrom is the six-o'clock direction or twelve-o'clock direction based on a direction of the short hand of a clock, according to the present invention. Further, each of the pair of the film substrates 11a and 11b is an optically anisotropic body, the refractive index thereof in the thickness directions being different from that thereof in a direction(s) in the plane thereof, has the retardation value(s) in the range of 5 to 30 nm in the plane of the film substrate, and, also, is arranged so that the maximum-refractive-index directions (lagging-axis directions) in the plane of the film substrate are approximately parallel to the long-axis directions of the liquid-crystal shutter. The retardation value is a value of dΔn where Δn denotes the difference in refractive index between a direction perpendicular to and a direction parallel to the optical-anisotropy axis of the substrate, and 'd' denotes the thickness of the substrate. Further, the long-axis directions are directions parallel to the longest side of the periphery of the liquid-crystal shutter.

Figure 4:
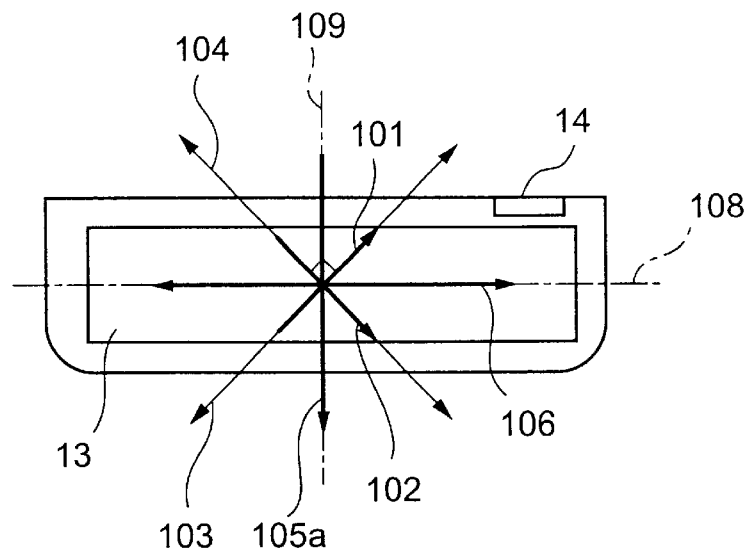
FIG. 4 shows a front elevational view of the liquid-crystal shutter in the first embodiment of the present invention.
Figure 5:
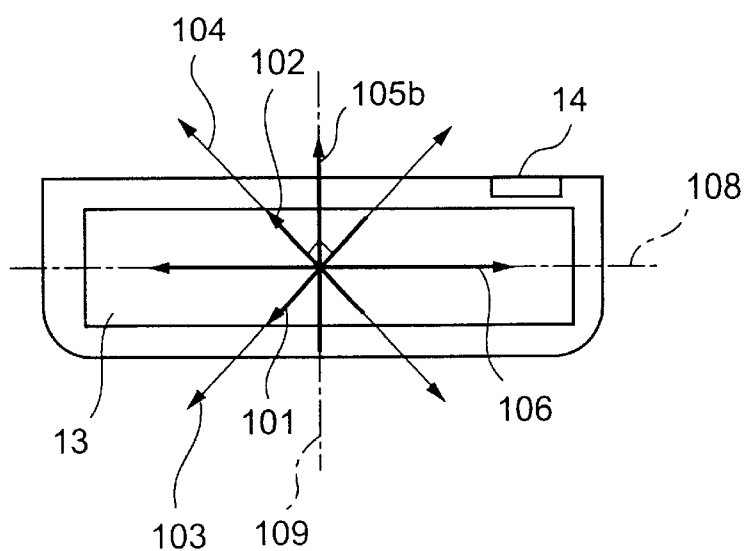
FIG. 5 shows a front elevational view of the liquid-crystal shutter in the second embodiment of the present invention.

FIGS. 4 and 5 shows front elevational views of liquid-crystal shutters in the first and second embodiments according to the present invention, respectively. As shown in FIGS. 4 and 5, each of these liquid-crystal shutters includes a display portion (transparent-electrode opposing portion) 13 and an extended electrode portion 14. Each of FIGS. 4 and 5 shows an upper-substrate rubbing direction 101, a lower-substrate rubbing direction 102, directions 103 of the transmission axis of the upper polarizing plate 12a, directions 104 of the transmission axis of the lower polarizing plate 12b, and lagging-axis directions (maximum-refractive-index directions) 106 of the upper and lower substrates 11a and 11b. Each of FIGS. 4 and 5 further shows the long-axis directions 108 and short axis directions 109 of the liquid-crystal shutter. As can be seen from each of FIGS. 4 and 5, an arrangement is made such that the maximum-refractive-index directions 106 in the plane of the film substrates are approximately parallel to the long-axis directions 108 of the liquid-crystal shutter. The long-axis directions are directions parallel to the longest side of the periphery of the liquid-crystal shutter.

In the arrangement shown in FIG. 4, the visual-angle direction in which a maximum contrast is obtained from the liquid-crystal shutter is the six-o'clock direction 105a based on a direction of the short hand of a clock. Because this arrangement is right-and-left symmetric, the visual-angle characteristics thereof are right-and-left symmetric, and, thereby, brightness received by one eye of a human being is the same as brightness received by the other eye of the human being. Further, a change in absolute value of retardation of each film substrate due to a change in visual-angle direction in right-and-left directions is smaller than that in an arrangement in which the lagging-axis directions in the plane of the film substrates are perpendicular to the long-axis directions of the liquid-crystal shutter. Thereby, contrasts for right and left visual-angle directions are improved.

In the arrangement shown in FIG. 5, the visual-angle direction in which a maximum contrast is obtained from the liquid-crystal shutter is the twelve-o'clock direction 105b based on a direction of the short hand of a clock. Similar to the arrangement of FIG. 4, because this arrangement is right-and-left symmetric, the visual-angle characteristics are right-and-left symmetric, and, thereby, brightness received by one eye of a human being is the same as brightness received by the other eye of the human being. Further, a change in absolute value of retardation of each film substrate due to a change in visual-angle direction in right-and-left directions is smaller that that in an arrangement in which the lagging-axis directions in the plane of the film substrates are perpendicular to the long-axis directions of the liquid-crystal shutter. Thereby, contrasts for right and left visual-angle directions are improved.

When the visual-angle direction in which a maximum contrast is obtained from a liquid-crystal shutter is other than the directions of six o'clock and twelve o'clock, for example, is the three-o'clock or nine-o'clock direction, the visual-angle characteristics for one eye are different from those for the other eye. When an arrangement is made such that the maximum-refractive-index directions (lagging-axis directions) of the film substrates are perpendicular to the long-axis directions of the liquid-crystal shutter, contrasts for right and left visual-angle directions are degraded. Further, when an arrangement is selected such that the maximum-refractive-index directions (lagging-axis directions) of the film substrates are neither perpendicular to nor parallel to the long-axis directions of the liquid-crystal shutter, brightness in an oblique direction for one eye is different from that for the other eye, because right and left symmetry of the arrangement is broken. Accordingly, in any arrangement other than those shown in FIGS. 4 and 5, brightness of the liquid-crystal shutter for both the eyes are different depending on visual-angle direction.

Figure 1:
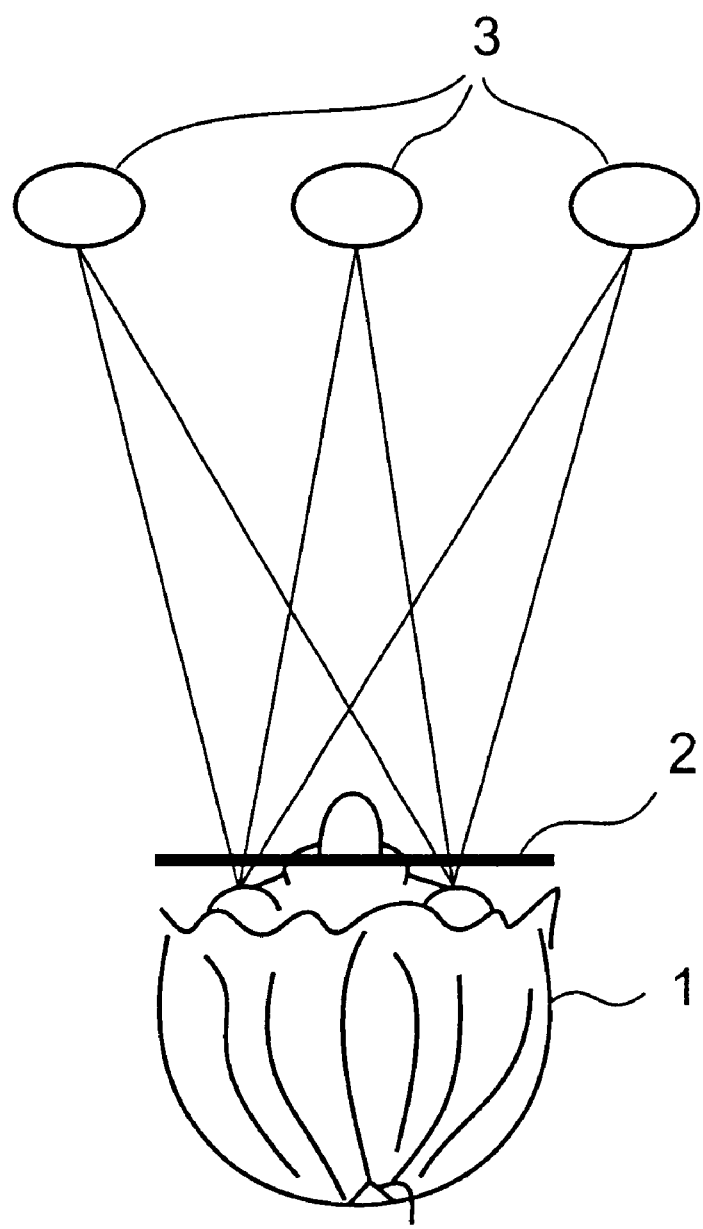
FIG. 1 shows a state in which a human being views objects through a liquid-crystal shutter.
Figure 2:
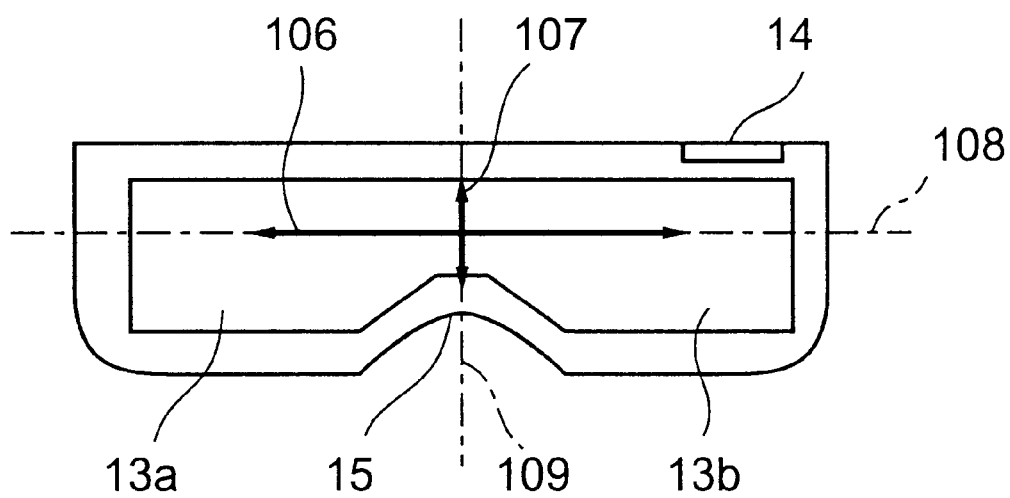
FIG. 2 shows an example of a liquid-crystal shutter used in front of the face of a human being.

Further, in each of the arrangements shown in FIGS. 4 and 5, it is possible to provide the constricted portion 15 in the liquid-crystal shutter according to the present invention, similarly to the case shown in FIG. 2. That is, it is possible for the liquid-crystal shutter to have a shape in which a portion corresponding to the nose of a human being is constricted. In other words, it is possible to form the liquid-crystal shutter so as to cause the liquid-crystal shutter to have a curved shape in which a portion of the periphery thereof is constricted in the middle.

In this case, the directions 106 are the lagging-axis directions of the upper and lower substrates, as described above, and, the directions 107 are the lagging-axis directions of retardation developing due to stress, as will be described later. Thus, the directions of substrate retardation developing due to stress are perpendicular to the lagging-axis directions 106 of the upper and lower substrates. When a liquid-crystal shutter has a shape in which a portion of the periphery thereof is constricted in the middle (when a liquid-crystal shutter is formed such that a portion of the periphery thereof (corresponding to the nose of a human being) is constricted) as mentioned above, it is possible to achieve a liquid-crystal shutter which can be easily loaded on the face of a human being. In this case, an arrangement is made such that the long-axis directions of the liquid-crystal shutter are approximately parallel to the lagging-axis directions (maximum-refractive-index directions) of the film substrates. Thereby, even when stress caused by shrinkage of the polarizing plates thereof concentrates to the constricted portion 15, the liquid-crystal shutter provides good contrasts, because the directions of retardation developing in the film substrates due to the stress caused by the shrinkage of the polarizing plates are perpendicular to the directions of retardation of the film substrates present when no stress is applied to the film substrates.

Further, it is also possible for a liquid-crystal shutter according to the present invention to have a shape obtained as a result of being bent in the long-axis directions thereof so as to have a curved-surface shape.

Figure 6:
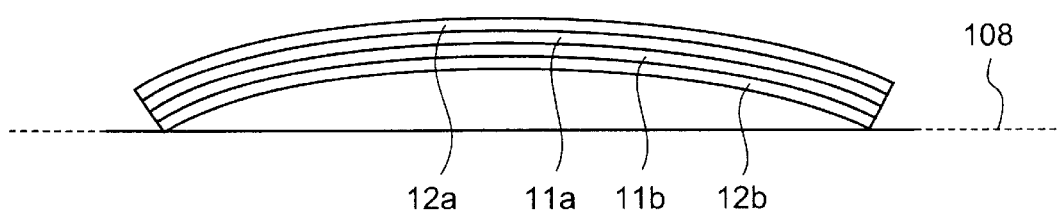
FIG. 6 shows a variant embodiment of each of the first and second embodiments according to the present invention in which the liquid-crystal shutter is bent in long-axis directions thereof so as to have a curved-surface, shape.

FIG. 6 shows a sectional view of an example in which a liquid-crystal shutter has a shape obtained as a result of being bent in the long-axis directions thereof so as to have a curved-surface shape. A liquid-crystal shutter having such a shape can be made as a result of a liquid-crystal shutter manufactured to have a flat shape being bent to have a curved-surface shape, then being maintained to have the curved-surface shape under a heated condition in the temperature of 60° C. for one hour, and, then, being cooled slowly.

Polycarbonate, polyacrylate, polyether sulfone or the like may be used as the material of a plastic film which is used as the base of each plastic-film substrate used in each of the first and second embodiments of the present invention. Such a plastic film may be made by the solvent-casting method, a melt-extrusion method, or the like. The gas-barrier layer and anti-solvent hard-coat layer are formed on at least one side of this film used as the base of each substrate of each embodiment of the present invention, and the transparent electrode made of ITO is formed on the other side thereof by a spattering method or the like.

The refractive index of such a film used as the base of each substrate of each embodiment of the present invention will now be described. When the refractive index of a polycarbonate film made by the solvent casting method and having the thickness of 100 $\mu$m, for example, was measured using an Abbe's refractometer and an Ellipsometer M-150 of JASCO (Nihon Bunko) Corporation with respect to the wavelength of 589 nm, the average refractive index=1.5831, nx=1,58364 in the lagging-axis directions (maximum-refractive-index directions) in the plane of the film substrate, ny=1.58354 in the leading-axis directions in the plane of the film substrate, and nz=1.58212 in the thickness directions were obtained.

Figure 7:
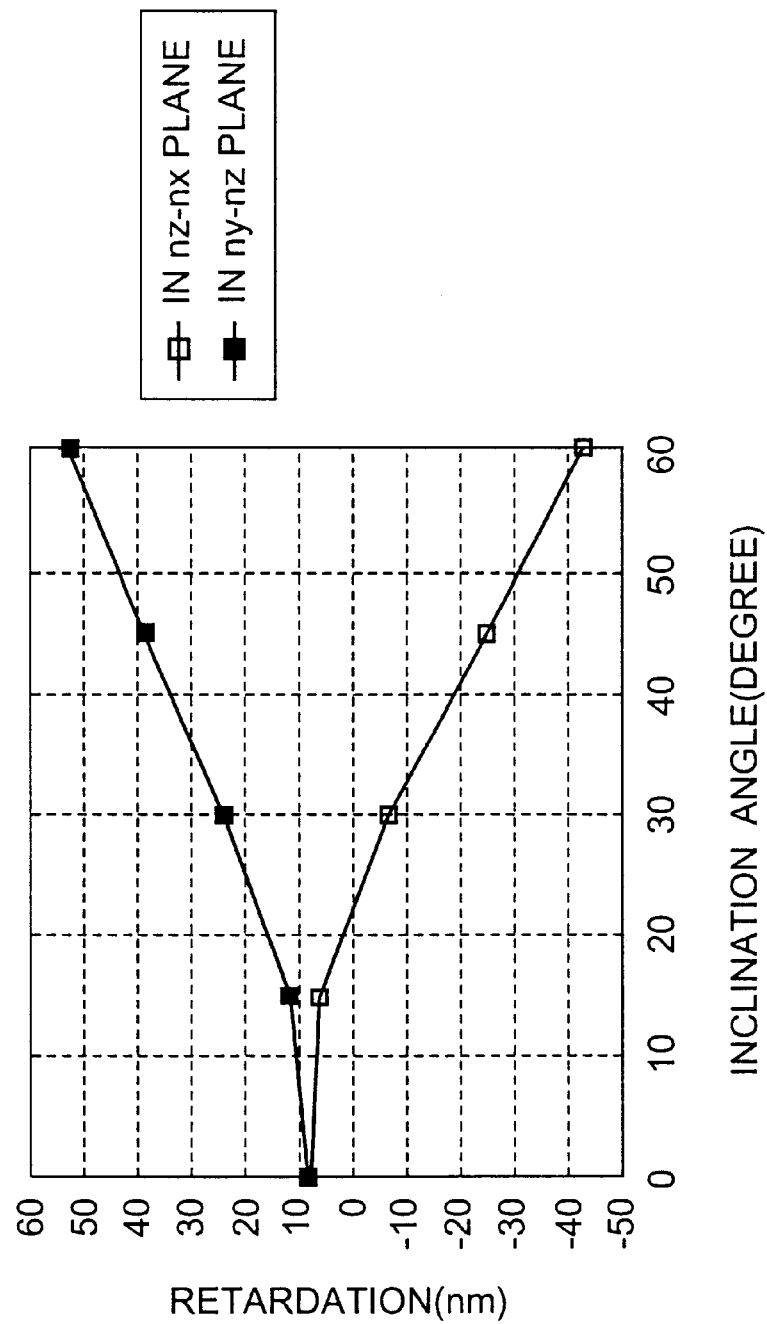
FIG. 7 shows visual-angle-direction dependency of retardation values of a film substrate.

Accordingly, the retardation value in a direction parallel to the plane of the substrate was 10 nm, and, thus, found to be small. Therefore, when a liquid-crystal device was made using this film as each substrate thereof, degradation in display characteristics due to influence of the retardation of the substrates did not appear much when the liquid-crystal device was viewed from the front. FIG. 7 shows the result obtained when the retardation was measured in a condition in which this substrate was inclined obliquely. A high-sensitivity automatic double-refraction measurement apparatus ADR-60XY made by ORC Manufacturing Co., Ltd. was used for the retardation measurement.

As shown in FIG. 7, when an inclination angle was in the ny-nz plane, that is, when the substrate was inclined in the nx directions, the retardation value thereof was large. When an inclination angle was in the nz-nx plane, that is, when the substrate was inclined in the ny directions, the retardation value thereof was small, and this means that the axis direction changed by 90° when an inclination angle was more than 20°. In any case, when the substrate was viewed from an oblique direction, a refractive index in the plane formed between the ray direction and the substrate-normal direction was small due to influence of the nz value.

The retardation value measured when the substrate was inclined in a direction by 600 differed by the range of 40 to 50 nm from the value measured when the substrate was not inclined, that is, when the substrate faced the front direction. Thus, although the retardation value measured when the substrate faced the front direction is small, a change in retardation occurring when a visual-angle direction was inclined obliquely caused deterioration in visual-angle characteristics of the liquid-crystal device.

When the refractive index of a polycarbonate film having the thickness of 125 $\mu$m made by the melt extrusion method was measured similarly, the average refractive index=1.5831, nx=1,58335 in the lagging-axis directions (maximum-refractive-index directions) in the plane of the film substrate, ny=1.58332 in the leading-axis directions in the plane of the film substrate, and nz=1.58263 in the thickness directions were obtained. As same as the above example, nz had the value smaller than those of nx, ny.

The present invention is characterized in that the maximum-refractive-index directions (lagging-axis directions) in the plane of the film substrates of a liquid-crystal shutter are approximately parallel to the long-axis directions of the liquid-crystal shutter. Thereby, a change in absolute value of retardation of the film substrates due to a change in visual-angle direction in right-and-left directions is smaller that that in an arrangement in which the lagging-axis directions in the plane of the film substrates are perpendicular to the long-axis directions of the liquid-crystal shutter. Thereby, contrasts for right and left visual-angle directions are improved.

Figure 8:
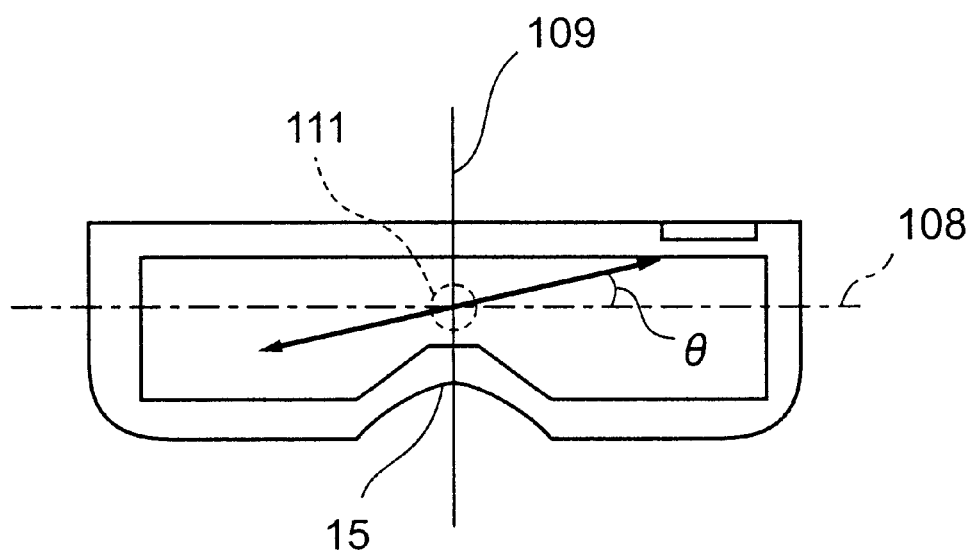
FIG. 8 shows an arrangement of a liquid crystal shutter used for evaluation.

FIG. 9 shows results of evaluations performed on liquid-crystal shutter having five arrangements (arrangements 1 through 5), respectively, each having a basic arrangement shown in FIG. 8.

Specifically, FIG. 9 shows the data of transmittance when each liquid-crystal shutter was turned on (a rectangular-wave voltage is applied to the liquid-crystal shutter) before and after being left for 240 hours at 70° C. When the liquid-crystal shutter was turned off (no voltage applied to the liquid-crystal shutter), the transmittance was approximately 32% in any arrangement and no particular difference appeared therebetween. Therefore, they are not shown in FIG. 9. The lower was the transmittance of a liquid-crystal shutter measured when the liquid-crystal shutter was turned on, the higher was the contrast of the liquid-crystal shutter. In FIG. 9, the angle each of the lagging-axis directions (LAGGING AXIS OF LOWER SUBSTRATE, LAGGING AXIS OF UPPER SUBSTRATE) denotes the angle of the lagging-axis directions measured from the long-axis directions 108 assuming that the counterclockwise direction is a positive direction, as indicated as the angle ζ in FIG. 8. The retardation value of each of the upper and lower film substrates of any arrangement was 10 nm. The lagging-axis directions of the film substrates of each arrangement were as shown in FIG. 9. NPF-G1220DU made by Nitto Denko Corporation was used as each of the polarizing plates of each arrangement. Further, in FIG. 9, in each of the arrangements 1, 2, 3 and 5, the polarizing plates were stuck on the upper and lower substrates, respectively, while in the arrangement 4 the polarizing plates were not stuck to but were set away from the upper and lower substrates, respectively. As shown in FIG. 9, in the arrangement 4 in which the polarizing plates were not stuck to the substrates, the transmittances were low before and after the liqui-dcrystal shutter was left for 204 hours at 70° C., because there was no influence of shrinkage of the polarizing plates. Further, the transmittances were lowest in the arrangement 5 (corresponding to the present invention) when the polarizing plates were stuck to the substrates.

Further, the present invention is not limited to the above-described embodiments, and variations and modifications may be made without departing from the scope of the present invention.

The present application is based on Japanese priority application No. 11-138166, filed on May 19, 1999, the entire contents of which are hereby incorporated by reference.

What is claimed is:

1. A liquid-crystal shutter, comprising:

a pair of transparent film substrates, a transparent electrode and an orientation film being formed in sequence on each of said pair of transparent film substrates; and a liquid crystal inserted between said pair of transparent film substrates, wherein:

an orientation process is performed on each of the orientation films such that a visual-angle direction in which a maximum contrast is obtained is a six-o'clock direction or a twelve-o'clock direction based on a direction of the short hand of a clock; and each of said pair of transparent film substrates is an optically anisotropic body such that refractive indexes thereof in thickness directions and plane directions differ, and has a retardation value or retardation values in the range of 5 to 30 nm in the plane of the transparent film substrate, wherein, assuming that long-axis directions denote directions parallel to the longest side of the periphery of said liquid-crystal shutter, the lagging-axis directions in the plane of the transparent film substrates are approximately parallel to the long-axis directions of said liquid-crystal shutter.

2. The liquid-crystal shutter as claimed in claim 1, wherein an approximately-90°-twisted twisted-nematic crystal is used as said liquid crystal.

3. The liquid-crystal shutter as claimed in claim 1, wherein said liquid-crystal shutter has a curved-line shape such that a portion of the periphery of said liquid-crystal shutter is constricted in the middle.

4. The liquid-crystal shutter as claimed in claim 1, wherein said liquid-crystal shutter is bent in the long-axis directions thereof so as to have a curved-surface shape.

* * * * *